United States Patent
Phadatare et al.

(10) Patent No.: US 9,233,657 B1
(45) Date of Patent: Jan. 12, 2016

(54) BUMPER ENERGY ABSORBER WITH LOCAL STIFFENING

(71) Applicant: Toyota Motor Engineering & Manufacturing North America, Inc., Erlanger, KY (US)

(72) Inventors: Avinash S. Phadatare, Canton, MI (US); Aaron Richard Steinhilb, Westland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/472,802

(22) Filed: Aug. 29, 2014

(51) Int. Cl.
*B60R 19/18* (2006.01)

(52) U.S. Cl.
CPC ...................... *B60R 19/18* (2013.01)

(58) Field of Classification Search
CPC ................ B60R 19/18; B60R 19/04
USPC ............ 293/120, 121, 122, 133; 296/187.04
See application file for complete search history.

(56) References Cited

U.S. PATENT DOCUMENTS

| | | | |
|---|---|---|---|
| 6,406,081 B1* | 6/2002 | Mahfet et al. | 293/133 |
| 7,188,876 B2 | 3/2007 | Jaarda et al. | |
| 8,016,331 B2 | 9/2011 | Ralston et al. | |
| 8,191,943 B2 | 6/2012 | Hellstrom | |
| 2003/0080573 A1* | 5/2003 | Marijnissen et al. | 293/132 |
| 2004/0094977 A1* | 5/2004 | Shuler et al. | 293/133 |
| 2006/0145491 A1* | 7/2006 | Shuler et al. | 293/120 |
| 2007/0200376 A1* | 8/2007 | Jaarda et al. | 293/120 |
| 2007/0278803 A1* | 12/2007 | Jaarda et al. | 293/120 |
| 2010/0109353 A1* | 5/2010 | Allen et al. | 293/120 |
| 2010/0176609 A1 | 7/2010 | Gill | |
| 2012/0061978 A9 | 3/2012 | Ralston et al. | |
| 2014/0001780 A1 | 1/2014 | Inoue | |

* cited by examiner

*Primary Examiner* — Jason S Morrow
(74) *Attorney, Agent, or Firm* — Christopher G. Darrow; Darrow Mustafa PC (57) ABSTRACT

A vehicle bumper structure includes a lateral arrangement of hollow lobes forming an energy absorption apparatus attached to a beam. The lobes are designed to provide a predetermined peak force resistance and a predetermined energy absorption capability. Local stiffening to increase the buckling resistance and energy absorption is provided by increased stiffness regions provided in one or more locations on one or more of the lobes. The local increased stiffness regions can be provided by an increased wall thickness surrounding apertures formed in selected shear walls of the lobes or a laterally outward offset in the shape of the shear walls of the lobes.

24 Claims, 5 Drawing Sheets

BUMPER ENERGY ABSORBER WITH LOCAL STIFFENING

BACKGROUND

The present disclosure relates to vehicle bumper structures and, particularly, to vehicle bumper structures with energy absorbing features.

Vehicle bumper structures frequently contain energy absorbers which are constructed to crush or buckle on impact with a predetermined rate of resistance and energy absorption. The energy absorbers can be in the form of a molded plastic base mounted on the forward facing surface of a laterally extending reinforcement beam coupled to a vehicle frame structure. A plurality of forward projecting, hollow lobes (also referred to as "crush lobes") are formed in and extend horizontally outward from the base. The lobes are spaced across the lateral extent of the base so as to cover substantially the entire forward surface of the vehicle bumper.

The shape and size of the individual lobes are designed to provide a predetermined amount of resistance force and energy absorption when the vehicle bumper contacts an object, such as a leg of a pedestrian. The buckling or crushing of the lobes at the point of impact with the pedestrian's leg is designed to minimize injury to the pedestrian by absorbing impact energy.

The lobes typically are in the form of a hollow box-like structure with top and bottom shear walls and left and right side shear walls joined at corner edges and at an outer, forward facing end by a closed front wall.

The material and thickness of the lobes can be chosen to provide a predetermined amount of resistance and energy absorption through controlled buckling or crushing of the lobes. Toward this end, small apertures are formed in various locations on each lobe to provide controlled buckling of the lobe. For example, apertures can be formed at the corner edges of the front wall and one or more of the top, bottom or side shear walls. Similarly, apertures can be formed at the bottom corners of each lobe where the top, bottom and side shear walls join to the base.

While the buckling of one or more lobes subjected to impact forces presents a predetermined design amount of resistance followed by a controlled buckling, once the lobe begins to buckle, resistance and energy absorption falls off rapidly. The bottom located apertures between the base and the bottom edges of the top, bottom and side shear walls of each lobe can provide a second peak buckling resistance force before further buckling of the lobe commences.

It will be desirable to provide a vehicle bumper structure with energy absorption features which has increased peak force resistance until buckling with less effect on other local impact positions of the vehicle bumper.

SUMMARY

A vehicle bumper apparatus and an energy absorber for a vehicle bumper include the energy absorption apparatus mounted on a laterally extending beam at one end of the vehicle. The energy absorption apparatus includes a base positioned on the beam and a plurality of lobes laterally spaced on the base and extending outward in one direction from the base.

Each lobe includes a pair of horizontal shear walls unitarily joined to a pair of vertical shear walls with the horizontal and vertical shear walls joined at one end by a front wall.

Corner edges are formed at junctions of the pair of horizontal shear walls and the pair of vertical shear walls. In at least one lobe, an aperture is formed in a corner edge of at least one vertical shear wall and one of the pair of adjacent horizontal shear walls, with the aperture extending along the corner edge from the base for a distance. At least one increased stiffness region is formed in the at least one lobe and incorporates the aperture. The increased stiffness region presents increased stiffness along one edge of the at least one lobe.

The at least one increased stiffness region may include one of a region surrounding the aperture in the at least one lobe having a thickness greater than a wall thickness of the adjoining vertical and horizontal shear walls, or a region surrounding the aperture which includes an offset wall portion disposed out of a major plane of the vertical and horizontal shear walls.

The at least one increased stiffness region can surround substantially the entire aperture in the at least one lobe.

The offset wall portion can include a step in the vertical and horizontal shear walls can extend laterally outward of the major plane of the vertical and horizontal shear walls of the at least one lobe.

In one aspect, the aperture and the at least one increased stiffness region includes a pair of apertures and a pair of increased stiffness regions disposed about the pair of apertures on adjacent corner edges of one vertical shear wall and the adjacent pair of horizontal shear walls.

The pair of increased stiffness regions can be formed in a laterally inward surface of one or more lobes of the plurality of lobes.

The apertures in the lobes can include at least one aperture in a shear wall adjacent the base and at least one aperture in a shear wall extending from the front wall. The increased stiffness region can be formed on either, both or none of the apertures. The increased stiffness region, when formed around the aperture in a shear wall extending from the front wall of one lobe and including a region surrounding the aperture having a thickness greater than a wall thickness of the adjoining vertical and horizontal shear walls, can extend interiorly within the lobe or exteriorly from the lobe. The increased stiffness region in a rear located aperture adjacent the base extends exteriorly from the lobe.

The number and location of the apertures and the increased stiffness regions can vary from lobe to lobe across the lateral extent of the vehicle bumper energy absorber to provide desired buckling characteristics and force absorption characteristics across the vehicle bumper energy absorber.

BRIEF DESCRIPTION OF THE DRAWING

The various features, advantages, and other uses of the present bumper energy absorption apparatus features with local stiffening will become more apparent by referring to the following detailed description and drawing in which.

DETAILED DESCRIPTION

A vehicle bumper structure with energy absorption features provides local stiffening at selected lobes to increase energy absorption at the outermost end lobes. Increased stiffness regions are provided about selected apertures formed in the lobes to provide a buckling point for controlled buckling and energy absorption. The increased stiffness regions can be formed on some or all of the lobes and on some or all of the apertures in selected lobes.

Referring now to FIGS. 1-4, there is depicted a bumper structure 10 with energy absorption apparatus which can be used on a front or rear end of a vehicle, such as an automobile, truck, ATV, etc.

Figure 1:
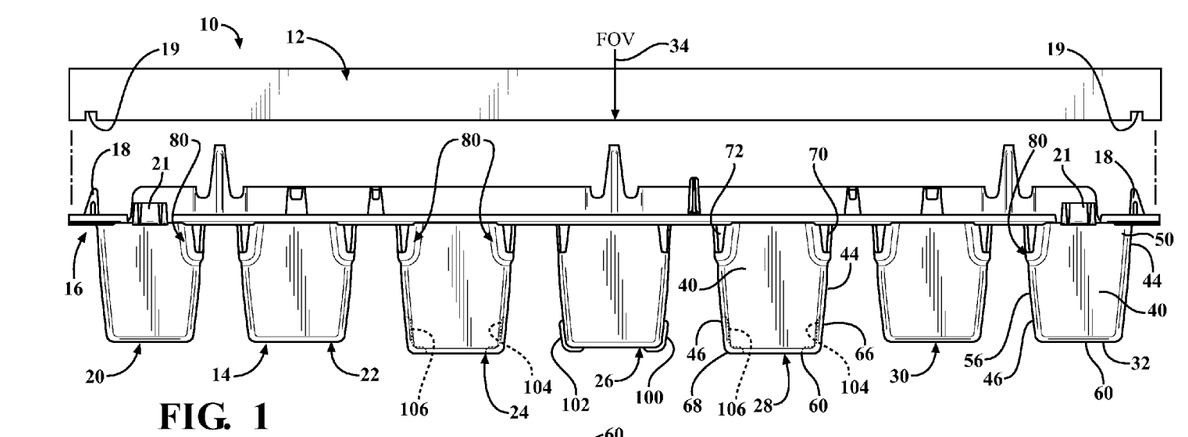
FIG. 1 is a plan view of a bumper energy absorption apparatus.
Figure 2:
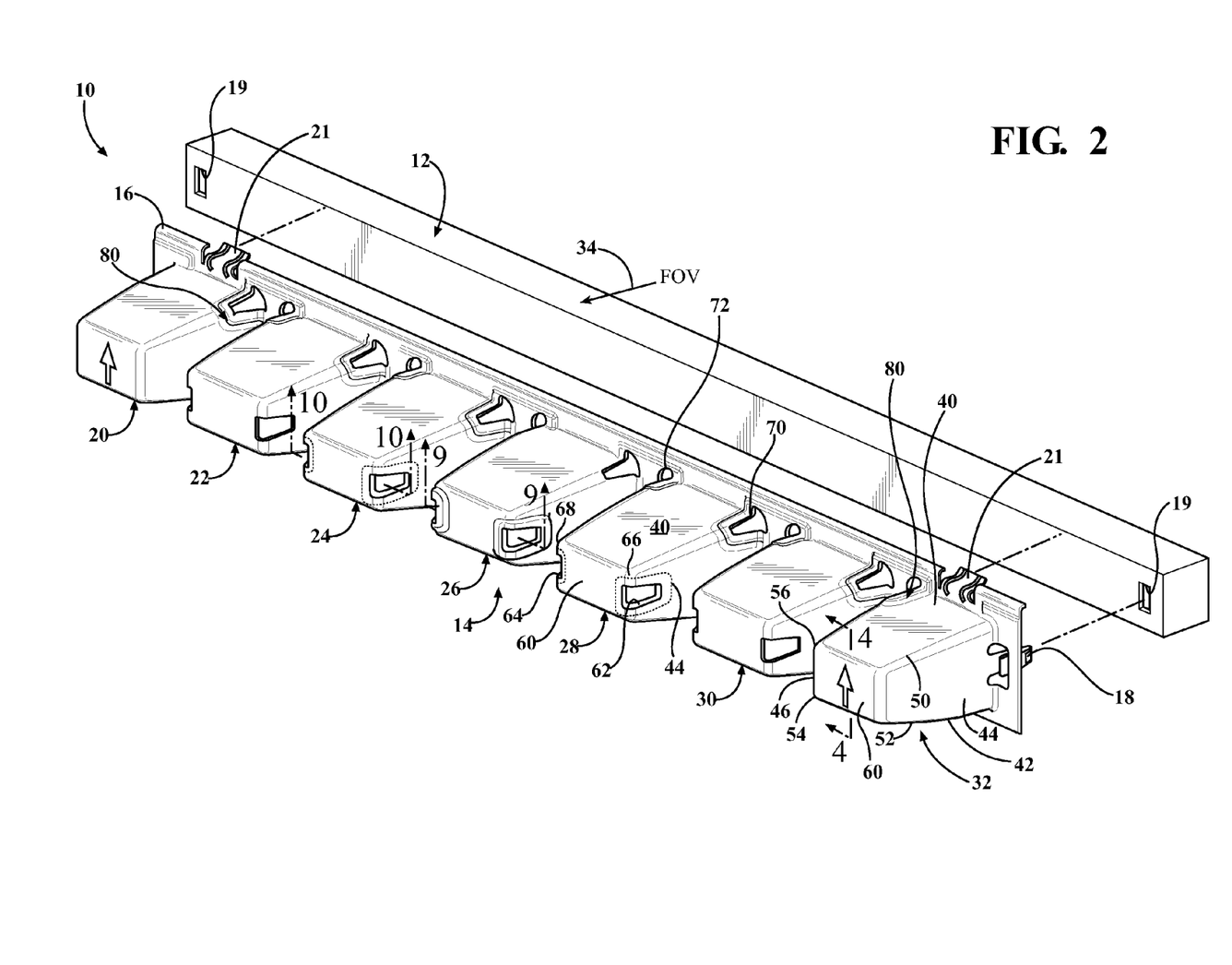
FIG. 2 is a front perspective view of the bumper energy absorption apparatus shown in FIG. 1.

The bumper structure 10 includes a structural beam 12, typically in the form of a hollow metal structural beam 12, which is affixedly mounted to a vehicle structure, such as a vehicle frame, by welding and/or fasteners.

An energy absorption apparatus or energy absorber 14 is mountable to one edge of the beam 12 and faces outward from the vehicle in a forward or rearward direction depending upon whether the beam 12 is attached to the forward or rearward end of the vehicle frame.

The energy absorption apparatus 14 extends laterally across the beam 12 and the front or rear end of a vehicle from one lateral side to the opposite lateral side, such as from the left side to the right side looking in the forward direction of the vehicle (FOV).

The energy absorption apparatus 14 can be formed of a molded polymeric material wherein an elongated base 16 is formed with a length suitable to span substantially the entire front surface of the beam 12. The base 16 can include integrally molded, unitary fasteners, such as snap clips 18, which engage apertures 19 in the beam 12 to mount the base 16 of the energy absorption apparatus 14 to the beam 12.

One or more spring tabs 21 can also be formed on the base 16 and extend perpendicularly from the base 16 to overlay and assist in securing the base 16 to the beam 12.

A plurality of lobes 20, 22, 24, 26, 28, 30 and 32, with seven lobes being shown by way of example only, are molded in the energy absorption apparatus 14 and extend outward in one direction from the base 16.

In the following description, the various terms used to describe each portion of the lobes 20-32 will be taken in a front of vehicle (FOV) direction with respect to the vehicle, that is, from a vehicle occupant's perspective looking to the front of the vehicle or in the direction of arrow 34 in FIGS. 1 and 2. Further, the terms front, rear, top, bottom and side will also be taken with respect to the FOV arrow 34. Thus, lobe 20 is a right outermost end lobe and lobe 32 is a left outermost end lobe.

The interior located lobes 22, 24, 26, 28 and 30 have similar shapes and may vary only in overall length from the rear edge to a front wall depending upon the contour of the vehicle bumper or the outer fascia which is mounted over the energy absorption apparatus 14.

Further, the left and right outermost end lobes 32 and 20, as well as the interior located lobes 22, 24, 26, 28 and 30 can have a similar overall shape formed, in the case of the left outermost end lobe 32, as shown in FIGS. 3-5 and 7, with four interconnected shear walls, including a pair of horizontal shear walls including a top horizontal shear wall 40 and an opposed bottom horizontal shear wall 42, and a pair of vertical shear walls including a first vertical shear wall 44 and a second vertical shear wall 46. The top and bottom horizontal and the opposed vertical shear walls 40, 42, 44 and 46 are unitarily joined by corners or edges 50, 52, 54 and 56. The corners or edges 50, 52, 54 and 56 can be curved at a radius.

Each of the top and bottom horizontal shear walls and the vertical shear walls 40, 42, 44 and 46 extend from the base 16 to an outer front wall 60.

Various apertures may be formed in the lobes 20-32 to provide predetermined buckling characteristics and force resistance. The apertures may be formed in any or all of the top and bottom and the side shear walls 40, 42, 44 and 46 and the front wall 60. The apertures may take any shape, such as polygonal, circular, oval, irregular shapes, etc. Further, the apertures may vary in size and shape from one lobe 20-32 to another lobe 20-32 and may have different sizes and shapes in different lobes 20-32. In addition, some lobes 20-32 may not have any apertures or may have only apertures located at the bottom portions adjacent the base 16, only apertures in the front wall 60 and extending partially into the side shear walls 44 and 46 or only apertures in one side shear wall 44 or 46.

The following description of the location, shape and function of various apertures of the interior located lobes 22-30 will be understood to be by way of example. For the interior located lobes 22-30, a pair of apertures 62 and 64 are formed in the vertical shear walls 44 and 46 or over edges 66 and 68 formed between the front wall 60 and an adjoining one of the vertical shear walls 44 and 46, respectively. The apertures 64 and 66 extend for a predetermined distance from the front wall 60 into the adjoining vertical shear walls 44 or 46 and provide a predetermined peak resistance force before the start of buckling of the front most portions of the interior located lobes 22-30 undergoing an impact force.

Similar apertures may be provided on the front wall 60 and one or more of the sidewalls 40 or 42 of the outermost end lobes 32 and 20 for desired controlled buckling of the outermost end lobes 30 and 32.

At least for the interior located lobes 22-30, rear located apertures 70, 72, 74 and 76 are formed along the rear portions of each edge 50, 52, 54 and 56 and extend for a predetermined distance along each edge 50, 52, 54 and 56 and into the base 16. The rear located apertures 70, 72, 74 and 76 create a secondary buckling force resulting in a second peak force resistance and additional energy absorption during bucking of one or more of the interior located lobes 20-32 undergoing an impact force.

As shown in FIGS. 1-8, the left and right outermost end lobes 32 and 20 are formed with an increased stiffness region, or regions, adjacent at least two edges, such as edges 54 and 56 of the outermost end lobes 32 and 20 to provide additional stiffening for increased peak impact force resistance of the outermost end lobes 32 and 20 and additional energy absorption during buckling of either lobe 32 or 20 undergoing an impact force on the front wall 60. The increased stiffness region, with two increased stiffness regions 80 and 81 shown by example, are formed on the inner corner edges 54 and 56 of the outermost end lobes 32 and 20 located adjacent to, but spaced from the adjacent interior lobes 22 or 30. Each increased stiffness region 80 and 81 includes an interior aperture 82, similar to the apertures 70 and 72 for the interior located lobes 22-30. However, the shape and/or the size, such as the dimensional thickness, as well as the width of each side of the increased stiffness regions 80 and 81 are selected to provide increased stiffening and controlled buckling of the outermost end lobes 32 and 20.

In one aspect, shown in FIGS. 1-5, 7 and 8 both increased stiffness regions 80 and 81 for the outermost end lobes 20 and 32 have an increased thickness denoted by reference number 84 than the remainder of the horizontal and vertical shear walls 40, 42, 44 and 46.

For example, outermost end lobes 20 and 32 can have an overall length from the base 16 to front wall 60 of 107.54 mm, the base 16 flange portions 86 and the front wall 60 may have a thickness of 1.75 mm, while the horizontal and vertical shear walls 40, 42, 44 and 46 may have an thickness of 1.5 mm.

Figure 3:
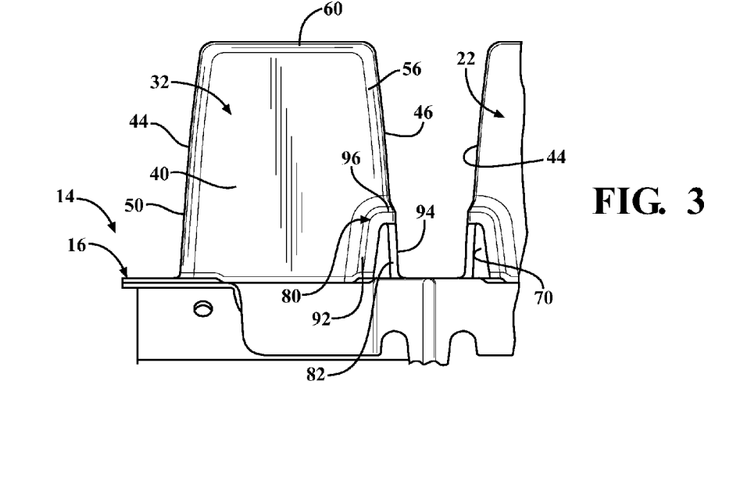
FIG. 3 is an enlarged top elevational view of a portion of the bumper energy absorption apparatus shown in FIGS. 1 and 2.
Figure 4:
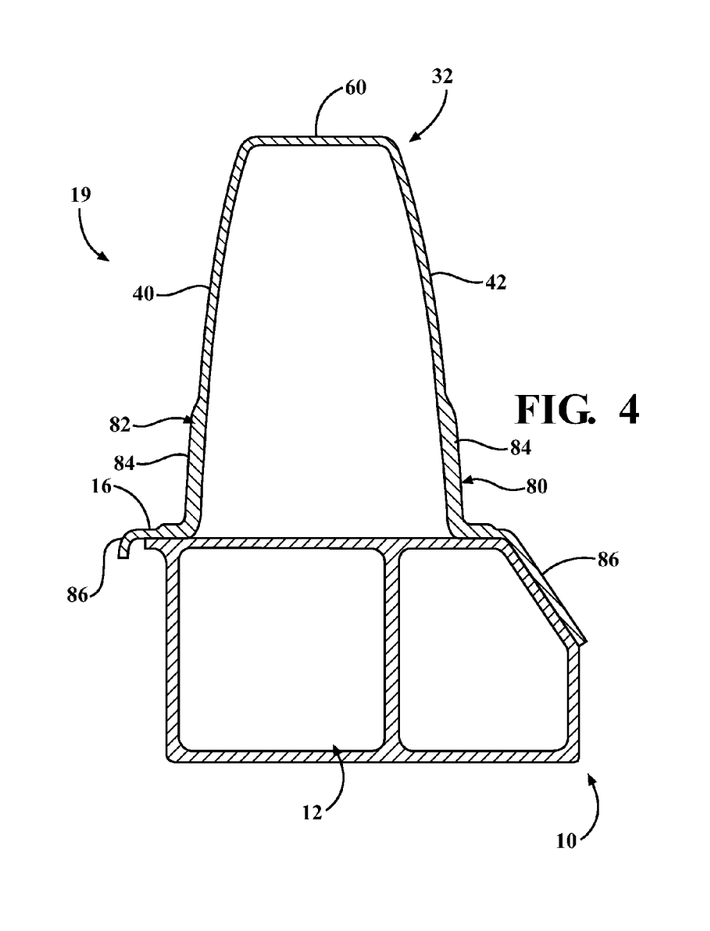
FIG. 4 is a cross-sectional view generally taken along line 4-4 in FIG. 2.
Figure 5:
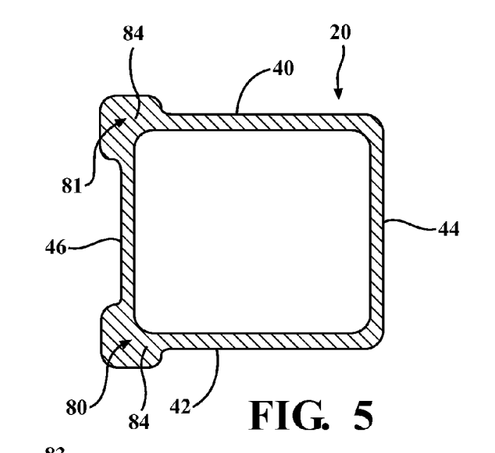
FIG. 5 is a cross-sectional view generally taken along line 5-5 in FIG. 8, showing a local stiffening feature.

In this one aspect, the increased stiffness regions 80 and 81 are formed with a thicker wall surrounding both opposed sides and the forward extending end of the aperture 82 as shown by reference numbers 92, 94, and 96, respectively in FIG. 3. The increased stiffness region 80 surrounds some or all of the aperture 82. The width of each thicker side section 92 and 94 and the thickened portion 96 of each increased stiffness region 80 and 81 can be selected to provide a predetermined buckling force resistance and energy absorption.

The increased thickness can be from 1.0 to 1.5 to 2.0 or more times the thickness of the adjacent shear vertical and horizontal shear walls 40, 42, and 46, depending upon the amount of bucking force resistance and energy absorption capability desired for a particular outermost end lobe 20 or 32. The width and thickness of each increased thickness can also vary. For example, the width and increased thickness beyond the existing thickness of the adjacent shear walls may be from 5 to 10 mm, for example.

As also shown in FIGS. 1-5, the increased thickness of each increased stiffness region 80 and 81 extends into the base 16 surrounding a base end portion of each corner aperture 82. The increased thickness of the base 16 surrounding the base portion of the aperture 82 may be provided only around the extent of the portion of the aperture 82 in the base 16.

Referring again to FIGS. 1-8, it can be seen that the increased stiffness regions 80, 81, 83 and 85 may be applied to all of the lobes 20-32 or only to certain of the lobes 20-32. If the increased stiffness regions 80, 81, 83 and 85 are provided on less than all of the lobes 20-32, the increased stiffness regions 80, 81, 83 and 85 may be provided on one or more lobes, 20-32 alternating lobes 20-32 or on one lobe 20-32 and then not on the next adjacent lobe 20-32.

For example, the enlarged outward extending increased stiffness regions 80, 81, 83 and 85 are provided on the bottom of the inner side edges 54 and 56 of one outermost end lobe 20, on the bottom of all four edges 50, 52, 54 and 56 of the interior located lobes 22, 24, 28 and 30, on the bottom of the inner side edges 54 and 56 of the opposed outermost lobe 32 and not at all on the apertures on the edges 54 and 56 of the innermost interior located lobe 26.

Figure 9:
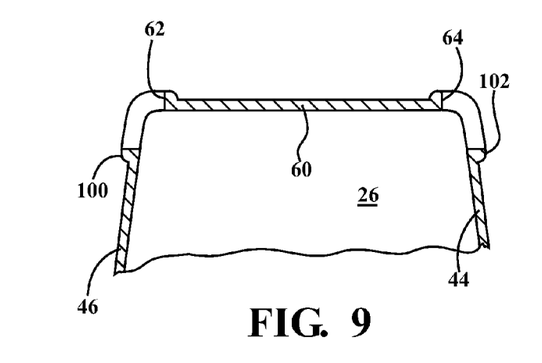
FIG. 9 is a cross-sectional view generally taken along line 9-9 in FIG. 2 showing an alternate front and side wall exteriorly extending increased stiffness region.
Figure 10:
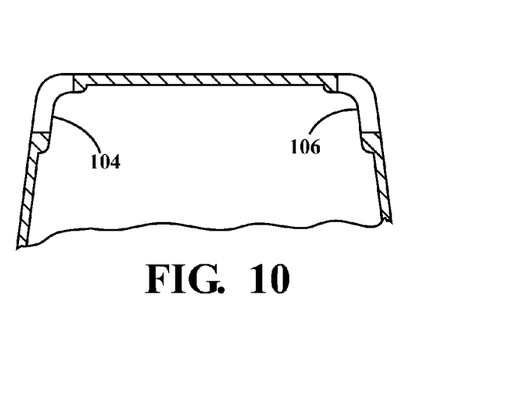
FIG. 10 is a cross-sectional view generally taken along line 10-10 in FIG. 2 and showing another aspect of a front and side wall interior located stiffening region.

Selected apertures 62 and 64 on some of the lobes 20-32 may or may not be provided with an increased thickness to provide an increased stiffness buckling point for selected lobes 20-32. For example, the outermost end lobes 20 and 32 lack any side apertures 62 and 64, by example. The apertures 62 and 64 on the innermost interior located lobe 26 extend outwardly as shown in FIG. 9 to form outward extending increased stiffness regions 100 and 102. Enlarged inward extending increased stiffness regions 104 and 106, shown in FIGS. 2 and 10, are provided on the interior located lobes 24 and 28. The increased stiffness regions 104 and 106 are disposed inward within the interior of the interior located lobes 24 and 28 as shown in FIG. 10.

Figure 6:
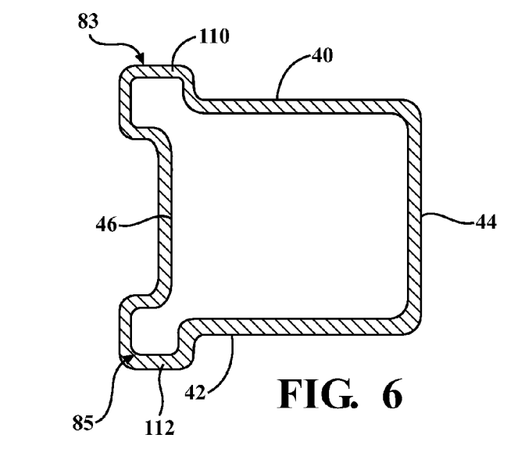
FIG. 6 is a cross-sectional view similar to FIG. 5, showing an alternate local stiffening feature.

The increased buckling resistance and energy absorption capability can also be provided by changing the shape of the increased stiffness regions of the outermost end lobes 20 and 32, as shown in FIG. 6, by forming each increased stiffness region 83 and 85, or any of the other enlarged increased stiffness regions 100, 102, 104 and 106, offset from a rear portion of each top and bottom 40 and 42 and one side shear wall 46 at the location between the rear edge of the outermost end lobes 20 and 32 in the base 16.

As shown in FIG. 6, an offset 110 and 112 is introduced in the horizontal shear walls 40 and 42 and the interconnecting vertical shear wall 46 which laterally positions the offset portion of each increased stiffness region 83 and 85 out of the plane of the adjacent horizontal shear walls 40 and 42 and the interconnecting vertical shear wall 46. The length of each offset 110 and 112 can be selected in the same manner as the length of the side and top portions of the increased thickness portions of the increased stiffness regions 80 and 81 shown in FIGS. 1-5 and 7 to provide a predetermined amount of peak buckling force resistance and energy absorption capability.

In use, the increased local stiffening provided in the outermost end lobes 20 and 32 by the configuration of the increased stiffness regions 80 and 81 or 83 and 85 increases peak buckling force resistance until buckling commences with less effect from impact forces on adjacent lobes. With a pedestrian leg impact force applied at position 120 in FIG. 7, the local stiffening provided by the increased stiffness regions 80 and 81 in the outermost end lobes 20 or 32 minimizes buckling forces applied through the vehicle fascia to an adjacent interior located lobe 22-30, such as inheritor located lobe 22. The local stiffening concentrates the impact force applied at position 120 on the side shear wall 46 to present desired peak buckling force resistance in energy absorption in the outermost end lobe 20.

Figure 7:
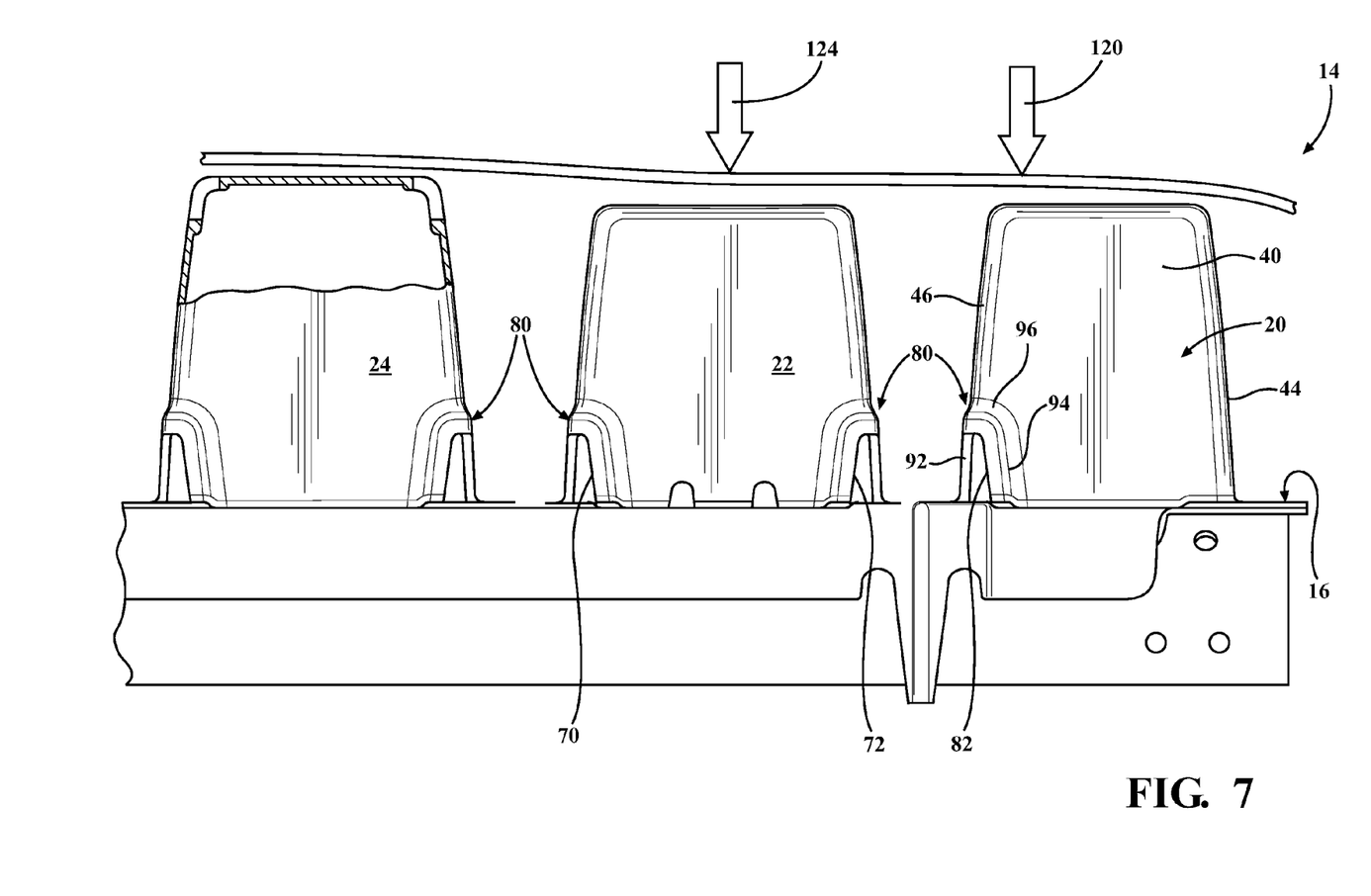
FIG. 7 is a partial plan view showing impact force loading on different lobes of the bumper energy absorption apparatus.
Figure 8:
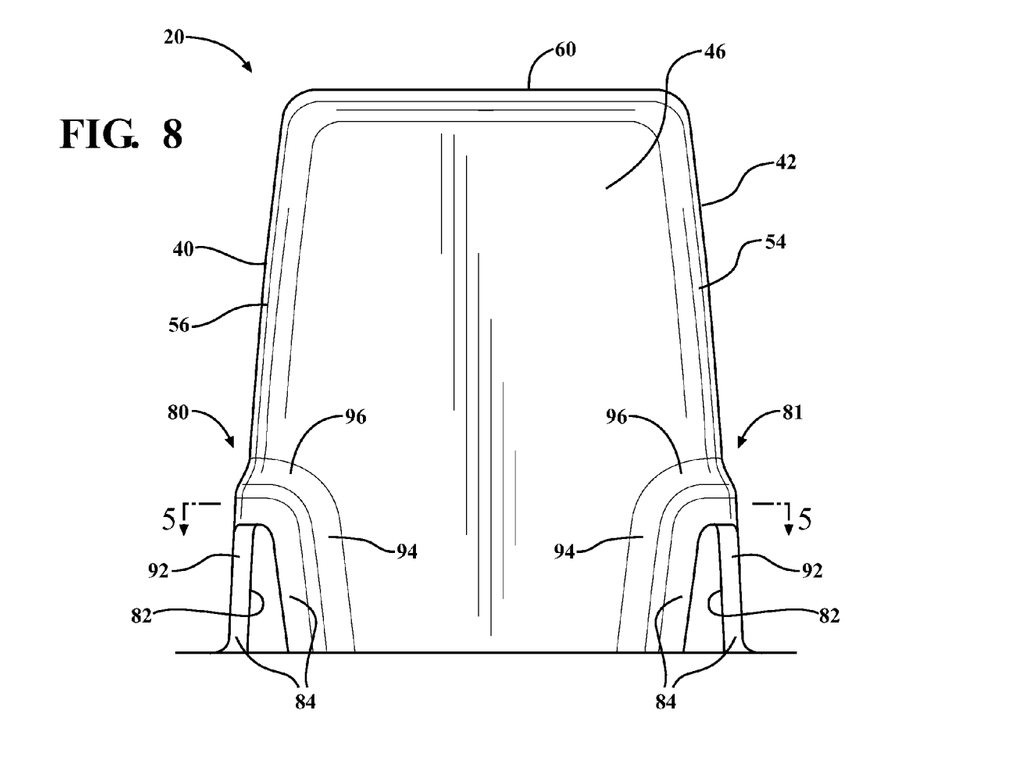
FIG. 8 is a side-elevational view of the end lobe of the bumper energy absorption apparatus shown in FIGS. 1-5, generally taken in a direction extending toward the outer end of the bumper energy absorption apparatus.

Similarly, a pedestrian leg impact force applied at location 124 essentially centered on the adjacent interior located lobe 22 will cause substantially all of the buckling in the lobe 22. The local stiffening provided by the increased stiffness regions 80 and 81 in the adjacent outermost end lobe 20 will prevent a portion of the pedestrian leg impact force from being applied to the outermost end lobe 20.

What is claimed is:

1. An energy absorption apparatus for a vehicle bumper having a laterally extending beam, the energy absorption apparatus comprising:
   a base positioned on the beam;
   a plurality of lobes laterally spaced on the base and extending in one direction from the base;
   each lobe including a pair of horizontal shear walls unitarily joined to a pair of vertical shear walls, the pair of horizontal shear walls and the pair of vertical shear walls joined at one end by a front wall;
   corner edges formed at junctions of the pair of horizontal shear walls and the pair of vertical shear walls;
   an aperture formed in at least one of the plurality of lobes; and
   at least one increased stiffness region formed in the at least one of the plurality of lobes, the increased stiffness region surrounding the aperture and having a stiffness greater than a stiffness in the remainder of the at least one of the plurality of lobes bordering the increased stiffness region in order to provide buckling control in the at least one of the plurality of lobes.

2. The energy absorption apparatus of claim 1 wherein the at least one increased stiffness region comprises:

one of a region surrounding the aperture having a thickness greater than a wall thickness of an adjoining vertical shear wall and an adjoining horizontal shear wall, and a region surrounding the aperture including an offset wall portion disposed out of a major plane of an adjoining vertical shear wall and an adjoining horizontal shear wall.

3. The energy absorption apparatus of claim 1 wherein the at least one increased stiffness region comprises:
a region surrounding the aperture, the region having a thickness greater than a wall thickness of an adjoining vertical shear wall and an adjoining horizontal shear wall.

4. The energy absorption apparatus of claim 3 wherein the region has a thickness at least 1.5 to 2.0 or more times the thickness of the adjoining vertical shear wall and the adjoining horizontal shear wall.

5. The energy absorption apparatus of claim 1 wherein:
the at least one increased stiffness region surrounds substantially all of the aperture in the at least one of the plurality of lobes.

6. The energy absorption apparatus of claim 1 wherein the at least one increased stiffness region comprises:
a region surrounding the aperture including an offset wall portion disposed out of a major plane of an adjoining vertical shear wall and an adjoining horizontal shear wall.

7. The energy absorption apparatus of claim 6 wherein the offset wall portion comprises:
a step in the adjoining vertical shear wall and the adjoining horizontal shear wall disposed outward of the plane of the adjoining vertical shear wall and the adjoining horizontal shear wall.

8. The energy absorption apparatus of claim 1 wherein:
the aperture includes a pair of apertures formed in two spaced corner edges formed at the junctions of one vertical shear wall and two adjoining horizontal shear walls; and
the at least one increased stiffness region includes at least one pair of increased stiffness regions formed in the at least one of the plurality of lobes, each increased stiffness region incorporating a respective one of the pair of apertures.

9. The energy absorption apparatus of claim 8 wherein:
the plurality of lobes includes first and second laterally outermost end lobes; and
the at least one pair of increased stiffness regions includes a pair of increased stiffness regions formed in each of the first and second laterally outermost end lobes.

10. The energy absorption apparatus of claim 1 wherein:
the aperture is formed in one of a rear portion of a corner edge formed adjacent the base at the junction of an adjoining vertical shear wall and an adjoining horizontal shear wall, and a side edge extending from the front wall between the pair of vertical shear walls or between the pair of horizontal shear walls.

11. The energy absorption apparatus of claim 1 wherein the at least one increased stiffness region comprises:
a region surrounding the aperture and projecting one of exteriorly from the at least one of the plurality of lobes, and interiorly within the at least one of the plurality of lobes.

12. The energy absorption apparatus of claim 11 wherein:
the aperture includes at least two apertures, a first of the two apertures formed in a rear portion of a corner edge formed adjacent the base at the junction of an adjoining vertical shear wall and an adjoining horizontal shear wall, and a second of the at least two apertures formed in a side edge extending from the front wall between the pair of vertical shear walls or between the pair of horizontal shear walls; and
the at least one increased stiffness region includes a region surrounding the first aperture and projecting exteriorly from the at least one of the plurality of lobes, and a region surrounding the second aperture and projecting interiorly within the at least one of the plurality of lobes.

13. A vehicle bumper comprising:
a laterally extending beam;
an energy absorber including a base position on the beam;
the base positioned on the beam;
a plurality of lobes laterally spaced on the base and extending in one direction from the base;
each lobe including a pair of horizontal shear walls unitarily joined to a pair of vertical shear walls, the pair of horizontal shear walls and the pair of vertical shear walls joined at one end by a front wall;
corner edges formed at junctions of the pair of horizontal shear walls and the pair of vertical shear walls;
an aperture formed in at least one of the plurality of lobes; and
at least one increased stiffness region formed in the at least one of the plurality of lobes, the increased stiffness region surrounding the aperture, and having a stiffness greater than a stiffness in the remainder of the at least one of the plurality of lobes bordering the increased stiffness region in order to provide buckling control in the at least one of the plurality of lobes.

14. The vehicle bumper of claim 13 wherein the at least one increased stiffness region comprises:
one of a region surrounding the aperture having a thickness greater than a wall thickness of an adjoining vertical shear wall and an adjoining horizontal shear wall, and a region surrounding the aperture including an offset wall portion disposed out of a major plane of an adjoining vertical shear wall and an adjoining horizontal shear wall.

15. The vehicle bumper of claim 13 wherein the increased stiffness region comprises:
a region surrounding the aperture, the region having a thickness greater than a wall thickness of an adjoining vertical shear wall and an adjoining horizontal shear wall.

16. The vehicle bumper of claim 15 wherein the region has a thickness at least 1.5 to 2.0 or more times the thickness of the adjoining vertical shear wall and the adjoining horizontal shear wall.

17. The vehicle bumper of claim 13 wherein:
the at least one increased stiffness region surrounds substantially all of the aperture in the at least one of the plurality of lobes.

18. The vehicle bumper of claim 13 wherein the at least one increased stiffness region comprises:
a region surrounding the aperture including an offset wall portion disposed out of a major plane of an adjoining vertical shear wall and an adjoining horizontal shear wall.

19. The vehicle bumper of claim 18 wherein the offset wall portion comprises:
a step in the adjoining vertical shear wall and the adjoining horizontal shear wall disposed outward of the plane of the adjoining vertical shear wall and the adjoining horizontal shear wall.

20. The vehicle bumper of claim 13 wherein:
the aperture includes a pair of apertures formed in two spaced corner edges formed at the junctions of one vertical shear wall and two adjoining horizontal shear walls; and
the at least one increased stiffness region includes at least one pair of increased stiffness regions formed in the at least one of the plurality of lobes, each increased stiffness region incorporating a respective one of the pair of apertures.

21. The vehicle bumper of claim 20 wherein;
the plurality of lobes includes first and second laterally outermost end lobes; and
the at least one pair of increased stiffness regions includes a pair of increased stiffness regions formed in each of the first and second laterally outermost end lobes.

22. The vehicle bumper of claim 13 wherein:
the aperture is formed in one of a rear portion of a corner edge formed adjacent the base at the junction of an adjoining vertical shear wall and an adjoining horizontal shear wall, and a side edge extending from the front wall between the pair of vertical shear walls or between the pair of horizontal shear walls.

23. The vehicle bumper of claim 13 wherein at least one increased stiffness region comprises:
a region surrounding the aperture and projecting one of exteriorly from the at least one of the plurality of lobes, and interiorly within the at least one of the plurality of lobes.

24. The vehicle bumper of claim 23 wherein:
the aperture includes at least two apertures, first of the two apertures formed in a rear portion of a corner edge formed adjacent the base at the junction of an adjoining vertical shear wall and an adjoining horizontal shear wall, and a second of the at least two apertures formed in a side edge extending from the front wall between the pair of vertical shear walls or between the pair of horizontal shear walls; and
the at least one increased stiffness region includes a region surrounding the first aperture and projecting exteriorly from the at least one of the plurality of lobes and a region surrounding the second aperture and projecting interiorly within the at least one of the plurality of lobes.

* * * * *